United States Patent [19]
Drvota et al.

[11] Patent Number: 5,348,113
[45] Date of Patent: Sep. 20, 1994

[54] PROCESS OF AND DEVICE FOR MORE EFFECTIVE USE OF THE DEFORMATION ZONE OF MOTOR VEHICLE BODIES

[76] Inventors: Jiří Drvota, Karla Capka 607, 252 30 Revnice; Milan Bursík, Steffánikova 28, 1500 00 Praha 5, Czechoslovakia

[21] Appl. No.: 105,592
[22] Filed: Aug. 12, 1993

[30] Foreign Application Priority Data
Aug. 13, 1992 [CS] Czechoslovakia ............ 2496-92

[51] Int. Cl.⁵ ........................................ B60D 1/28
[52] U.S. Cl. ........................... 180/271; 296/189
[58] Field of Search .............. 180/271, 274; 296/188, 296/189; 280/784, 748

[56] References Cited

U.S. PATENT DOCUMENTS

| | | | |
|---|---|---|---|
| 2,929,637 | 3/1960 | Papacosta | 280/748 |
| 3,794,342 | 2/1974 | Froumajou et al. | 296/189 |
| 3,998,291 | 12/1976 | Davis | 180/271 |
| 4,148,505 | 4/1979 | Jensen et al. | 280/784 |
| 4,410,212 | 10/1983 | Sturtz et al. | 180/271 |
| 5,275,436 | 1/1994 | Pomero | 296/189 |

FOREIGN PATENT DOCUMENTS

2219318 11/1973 Fed. Rep. of Germany ...... 280/784

*Primary Examiner*—Brian L. Johnson
*Assistant Examiner*—Christopher P. Ellis
*Attorney, Agent, or Firm*—Notaro & Michalos

[57] ABSTRACT

More effective use of the deformation zone for the absorption of the impact energy in a vehicle body of graded rigidity is achieved at the moment of deformation of the deformation zone. Pressure by the tyre against the passenger cabin causes its deformation and the tyre gets destructed and deflated, thus allowing for additional deformation of the deformation zone up to the moment of the contact between the rim and the passenger cabin. A destruction member for the tyre is situated in the area of the contact occurring in the deformation zone between the tyre and the passenger cabin. The destruction member may be formed by spikes, punches or cutting edges and is fitted with puncturable covers.

12 Claims, 2 Drawing Sheets

PROCESS OF AND DEVICE FOR MORE EFFECTIVE USE OF THE DEFORMATION ZONE OF MOTOR VEHICLE BODIES

FIELD AND BACKGROUND OF THE INVENTION

The invention offers a process of more effective use of the deformation zone of a motor vehicle body of graded rigidity and a device enabling the application of the process.

There exist motor vehicle bodies of graded rigidity in which the passanger compartment represents the relatively most rigid part of the body while the less rigid front and rear parts of the body represent a deformation zone serving for the absorption of the energy generated by possible collision of the vehicle with a foreign body or vice versa. However, due to the considerations of design, certain rigid and difficult to deform vehicle parts are also situated in such deformation zones. These are, for example, the vehicle driving gear, road wheels and, in some cases, the spare wheel. In case of deformation of the deformation zone, these parts remain basically undeformed as they "bridge" a certain part of the deformation zone and tend to transfer a part of the unabsorbed impact energy to the passenger compartment, thereby threatening the lives or health of the motor vehicle passengers.

The effectively used length of the deformation zone can be expressed on the basis of the following formula:

$$L_S L_C - L_t$$

where $L_S$ = effectively used length of the deformation zone,
$L_C$ = total length of the deformation zone,
$L_t$ = length of the largest rigid body situated in the deformation zone or, sum of the lengths of the rigid bodies situated one after the other in the deformation zone.

There exist motor vehicles designs using front engines. In case of head-on collision, the front deformation zone deforms, while the engine and the gearbox are forced under the passenger compartment. In this case, the vehicle driving unit does not "bridge" any part of the deformation zone, allowing thus for better absorption of the impact energy. Other voluminous and relatively rigid bodies which are situated in deformation zones of motor vehicles and, in case of collision, reduce the length of the deformation zone, are motor vehicle wheels, both road wheels and the spare wheel. Two solutions are being used to prevent deformation of the passanger compartment by a road wheel or spare wheel—either through increased rigidity of the passanger compartment in the areas of anticipated pressure by a wheel or, through the extension of the deformation zone in front of the vehicle wheels (in the direction of the impact). The former measure results into increased weight of the body and quantity of work in its manufacture while the latter, in addition, increases the total length of the vehicle body.

SUMMARY OF THE INVENTION

In case of vehicle bodies of graded rigidity and wheels with pneumatic lyres, the above disadvantages can be, to a large measure, mitigated by the process of more effective use of the deformation zone for the absorption of the impact energy in case of vehicle bodies of graded rigidity and wheels with pneumatic tyres. The substance of the process according to the present invention consists in the following: At that moment of the process of deformation of the deformation zone at which the pressure exerted by the tyre against the passanger compartment would normally cause plastic deformation of the latter, the tyres get destructed and the resulting deflation extends the deformation zone up to the moment at which the road wheel rim comes into contact with the passenger compartment.

In order to achieve that, a device will be used to destroy the tyre. A tyre destruction member is situated in the area of anticipated contact occurring between the tyre and the passanger compartment in the process of deformation of the deformation zone.

Tyre destruction members may have pointed ends, punches or cutting edges whose bases are mounted on the relatively rigid part of the vehicle body—the passenger compartment—with the edges pointing towards the tyre. It is advantageous to fit the edges with a puncturable cover.

Figure 2:
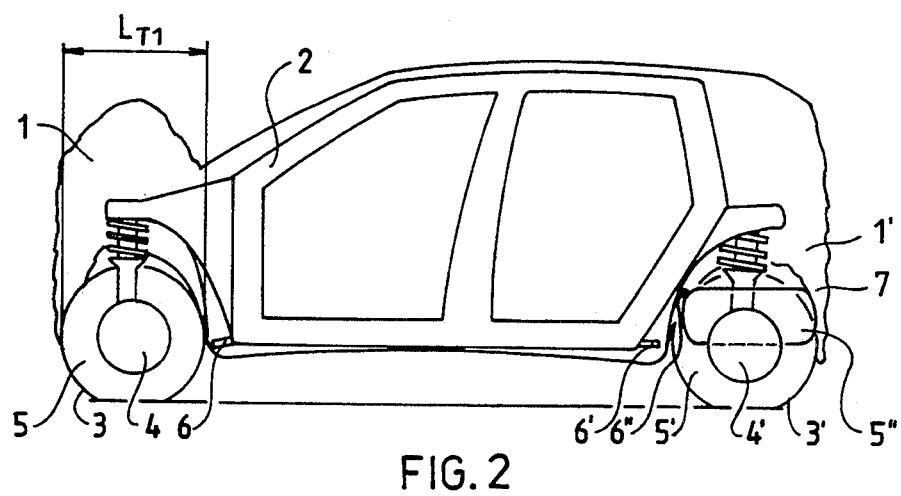
FIG. 2 is a schematic view illustrating a motor vehicle with maximum possible deformation of the deformation zone, without the tyre destruction; wherein no deformation occurs at the passanger.
Figure 3:
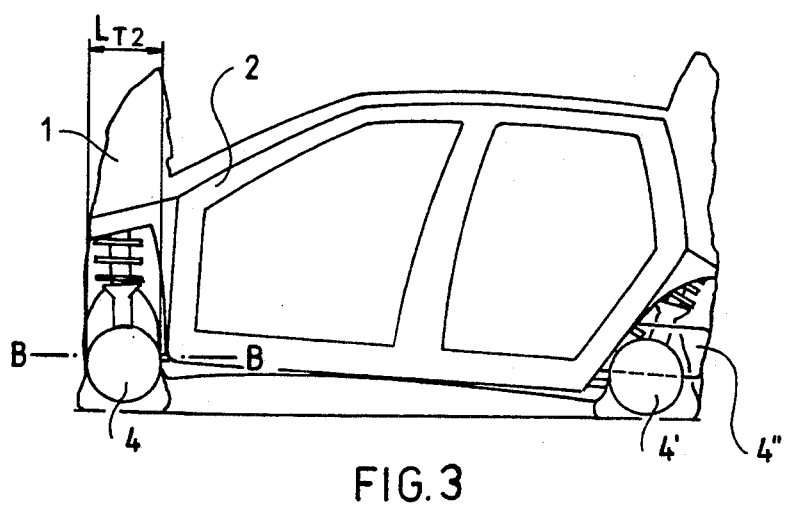
FIG. 3 is a schematic view illustrating a motor vehicle with maximum deformation of the deformation zone and destructed tyres, wherein no deformation occurs at the passenger compartment.
Figure 4:
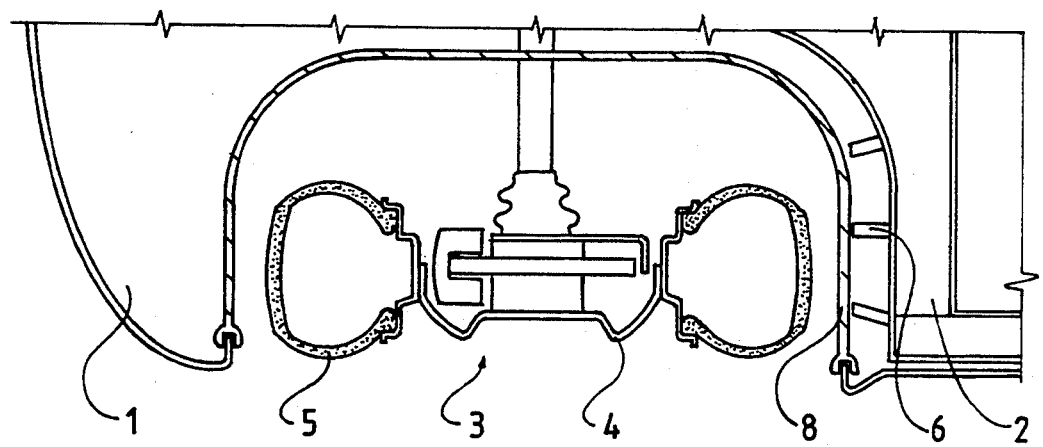
FIG. 4 is a partial sectional view of FIG. 1 taken along line A—A.
Figure 5:
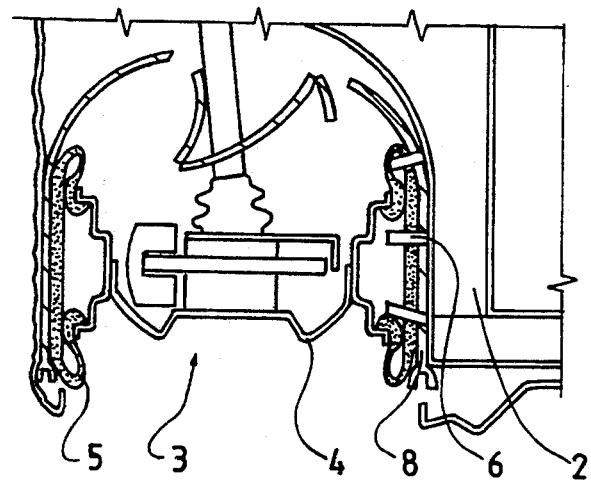
FIG. 5 is a partial sectional view of FIG. 3 taken along line B—B.

As it is obvious from the attached figures, the process of more effective use of the deformation zone 1, 1' for the absorption of the impact energy in case of bodies of graded rigidity and wheels 3, 3', 3" with the pneumatic tyres 5, 5', 5" provides for the following: At that moment of the process of deformation of the deformation zone 1, 1' when the pressure of the tyre 5, 5', 5" against the passenger compartment 2 would normally start causing its plastic deformation (see FIG. 2), the destruction of the tyre 5, 5', 5" deflates the tyre, thus causing the reduction of the outer diameter of the wheel 3, 3', 3" and continuation of the process of deformation of the deformation zone 1, 1', up to the moment of contact between the rim 4, 4', 4" of the wheel 3, 3', 3" with the passanger compartment 2 (see FIG. 3). In this way additional deformation of the deformation , zone 1, 1 is enabled, equaling to length $L_{t1}-L_{t2}$) which comprise two heights of the tyre 5, 5', 5" (see FIG. 2, 3).

Figure 1:
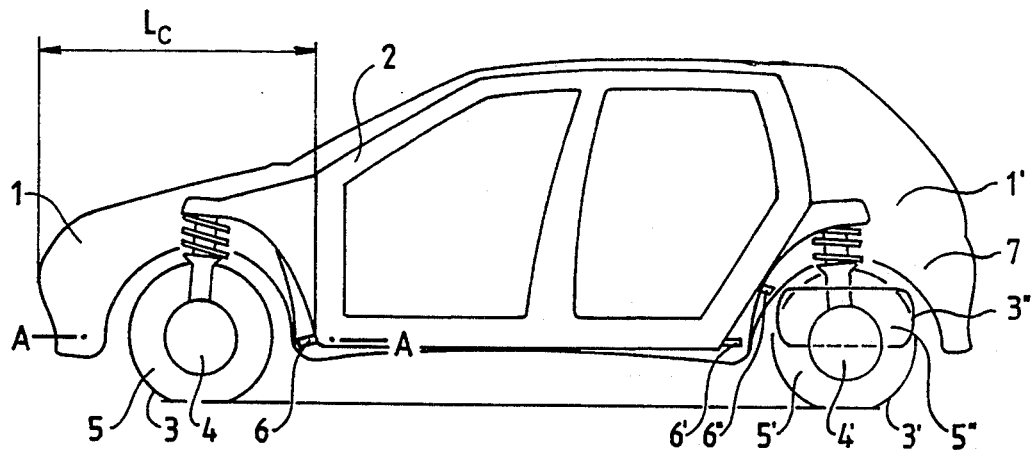
FIG. 1 is a schematic view illustrating a motor vehicle with undeformed deformation zones.

As presented in FIG. 1, the body of graded rigidity consists of the front and rear parts of lower rigidity which form the front deformation zone 1' and rear deformation zone 1', respectively, with the passanger compartment 2 as the relatively rigid part of the body situated between the front and rear parts. In the front deformation zone 1, front road wheels are mounted on the front axle and, in the rear deformation zone 1', rear road wheels are mounted on the rear axles, while the spare wheel 3" is placed in the baggage compartment. The front and rear road wheels 3, 3' as well as the spare wheel 3" consist of the rim 4, 4', 4" fitted with inflated tyres 5, 5', 5". Mounted on the passanger compartment 2 behind the tyres 5, 5', 5"—in the direction of possible impact—are destruction members 6, 6', 6". Destruction members 6, 6', 6" are formed by spikes whose bases are mounted on the passanger compartment 2 and their cutting edges point towards the tyres 5, 5', 5". The cutting edges are fitted with puncturable covers 8, 8', 8" which serve, on the one hand, to prevent possible injury during normal maintenance of the vehicle and, on the other hand, to prevent unnecessary destruction of the tyre 5, 5=, 5" in case only moderate pressure against the destruction member i.e. in case when impact energy has already been fully absorbed and there is no need for additional use of the deformation zone 1, 1'. Based on this consideration, the puncturable cover 8, 8', 8", which is formed by the wheel arch guards is dimensioned in such a way that the destruction member 6, 6', 6" punctures it only in case of such pressure by the tyre 5, 5', 5" that would be able to cause plastic deformation of the passanger compartment 2.

In place of spikes, punches, cutting edges, etc. may be used.

We claim:

1. A device for effective use of a deformation zone of a motor vehicle body having a passenger compartment, the device comprising:
   at least one deformation zone attached to the passenger compartment;
   at least one vehicle wheel having a rim surrounded by an inflated pneumatic tire, the wheel being located in the deformation zone near the passenger compartment;
   at least one destruction member fixed between the passenger compartment and the inflated pneumatic tire of the wheel for puncturing and deflating the tire upon deformation of the deformation zone.

2. A device for effective use of a deformation zone of a motor vehicle body having a passenger compartment with a front part and a rear part, the device comprising:
   a front deformation zone attached to the front part of the passenger compartment;
   a rear deformation zone attached to the rear part of the passenger compartment;
   a front vehicle wheel located in the front deformation zone near the front part of the passenger compartment;
   a rear vehicle wheel located in the rear deformation zone near the rear part of the passenger compartment;
   each of said wheels having a rim surrounded by an inflated pneumatic tire;
   at least one destruction member fixed between the front part of the passenger compartment and the inflated tire of the front wheel and at least one destruction member fixed between the rear part of the passenger compartment and the inflated tire of the rear wheel for puncturing and deflating the tires upon deformation of the deformation zones.

3. The device according to claim 1, wherein the destruction member has a puncturable cover.

4. The device according to claim 1, wherein the destruction member comprises a plurality of spikes having tips extending toward the tire and bases mounted to the passenger compartment.

5. The device according to claim 1, wherein the destruction member comprises a plurality of cutting edges.

6. The device according to claim 1, wherein the destruction member comprises a plurality of punches.

7. The device according to claim 1, wherein the puncturable cover of the destruction member is a wheel arch guard.

8. The device according to claim 2, wherein the destruction member has a puncturable cover.

9. The device according to claim 2, wherein the destruction member comprises a number of spikes having tips extending toward the tire and bases mounted to the passenger compartment.

10. The device according to claim 2, wherein the destruction member comprises a plurality of cutting edges.

11. The device according to claim 2, wherein the destruction member comprises a plurality of punches.

12. The device according to claim 2, wherein the puncturable cover of the destruction member is a wheel arch guard.

* * * * *